United States Patent
Cohen et al.

(10) Patent No.: US 6,952,779 B1
(45) Date of Patent: Oct. 4, 2005

(54) SYSTEM AND METHOD FOR RISK DETECTION AND ANALYSIS IN A COMPUTER NETWORK

(76) Inventors: Gideon Cohen, 1 Irus Street, Mazor (IL) 73160; Moshe Meiseles, 22 Alexander Pen Street, Hon Hasharon (IL) 45201; Eran Reshef, 16 Lotem Street, Lehavim (IL)

( * ) Notice: Subject to any disclaimer, the term of this patent is extended or adjusted under 35 U.S.C. 154(b) by 0 days.

(21) Appl. No.: 10/262,648

(22) Filed: Oct. 1, 2002

(51) Int. Cl.[7] ............................................. H04L 9/00
(52) U.S. Cl. ........................................ 713/200; 713/201
(58) Field of Search ......................... 713/201, 200; 709/225

(56) References Cited

U.S. PATENT DOCUMENTS

| | | | |
|---|---|---|---|
| 4,773,028 A | 9/1988 | Tallman | |
| 5,032,979 A | 7/1991 | Hecht et al. | |
| 5,278,901 A | 1/1994 | Shieh et al. | |
| 5,295,230 A | 3/1994 | Kung | |
| 5,361,359 A | 11/1994 | Tajalli et al. | |
| 5,475,625 A | 12/1995 | Glaschick | |
| 5,485,409 A | 1/1996 | Gupta et al. | |
| 5,557,742 A | 9/1996 | Smaha et al. | |
| 5,621,889 A | 4/1997 | Lermuzeaux et al. | |
| 5,796,942 A | 8/1998 | Esbensen | |
| 5,812,763 A | 9/1998 | Teng | |
| 5,819,094 A | 10/1998 | Sato et al. | |
| 5,850,516 A | 12/1998 | Schneier | |
| 5,892,903 A | 4/1999 | Klaus | |
| 5,923,849 A | 7/1999 | Venkatraman | |
| 5,926,463 A | 7/1999 | Ahearn et al. | |
| 5,931,946 A | 8/1999 | Terada | |
| 5,958,010 A | 9/1999 | Agarwal et al. | |
| 5,991,881 A | 11/1999 | Conklin | |
| 6,070,244 A | 5/2000 | Orchier et al. | |
| 6,088,804 A * | 7/2000 | Hill et al. | 713/201 |
| 6,134,664 A | 10/2000 | Walker | |
| 6,185,689 B1 * | 2/2001 | Todd, Sr. et al. | 713/201 |
| 6,205,552 B1 | 3/2001 | Fudge | |
| 6,212,558 B1 | 4/2001 | Antur et al. | |
| 6,253,337 B1 | 6/2001 | Maloney et al. | |
| 6,275,942 B1 | 8/2001 | Bernhard et al. | |
| 6,282,546 B1 | 8/2001 | Gleichauf et al. | |
| 6,295,607 B1 | 9/2001 | Johnson | |
| 6,298,445 B1 | 10/2001 | Shostack et al. | |
| 6,301,613 B1 | 10/2001 | Ahlstrom et al. | |
| 6,301,668 B1 * | 10/2001 | Gleichauf et al. | 713/201 |
| 6,301,699 B1 | 10/2001 | Hollander et al. | |
| 6,324,656 B1 * | 11/2001 | Gleichauf et al. | 714/37 |
| 6,415,321 B1 | 7/2002 | Gleichauf et al. | |
| 6,546,493 B1 * | 4/2003 | Magdych et al. | 713/201 |

OTHER PUBLICATIONS

Swiler, Laura Painton, et al.; "A Graph-Based Network-Vulnerability Analysis System", Sandia Report, Jan. 1998, pp. 1-21.

(Continued)

Primary Examiner—Gregory Morse
Assistant Examiner—Andrew L. Nalven
(74) Attorney, Agent, or Firm—Brown Raysman Millstein Felder & Steiner LLP

(57) ABSTRACT

The present invention provides systems and methods for risk detection and analysis in a computer network. Computerized, automated systems and methods can be provided. Raw vulnerability information and network information can be utilized in determining actual vulnerability information associated with network nodes. Methods are provided in which computer networks are modeled, and the models utilized in performing attack simulations and determining risks associated with vulnerabilities. Risks can be evaluated and prioritized, and fix information can be provided.

13 Claims, 5 Drawing Sheets

OTHER PUBLICATIONS

Phillips, Cynthia, et al.; "A Preliminary Classification Scheme for Information System Threats, Attacks, and Defenses; A Cause and Effect Model; and Some Analysis Based on that Model", Sandia National Laboratories, Sep., 1998, pp. 1-78.

http://www-2.cs.cmu.edu/afs/cs.cmu.edu/project/venari/www/usenix96-kindred-wing.html, Kindred, Darrell, et al.; "Fast, Automatic Checking of Security Protocols", pp. 1-19.

Wing, Jeannette M., et al.; "Survivability Analysis of Networked Systems", Computer Science Dept., Carnegie Mellon Univ., Pittsburgh, PA; Information and Communications Univ., Taejon, Korea, May, 14, 2001, pp. 1-31.

Wyss, Gregory D., et al.; "Information Systems Vulnerability: A Systems Analysis Perspective", Sandia National Laboratories, pp. 1-14.

http://www.math.uiuc.edu/Hilda/htmlcalenders/Apr24_00/jha_apr24-00.html, Jha, Somesh; "Survivability Analysis of Software Specifications", Department of Mathmatics, University of Illinois at Urbana-Champaign, Abstract.

Oleg Sheyner, et al.; "Toward Compositional Analysis of Security Protocols Using Theorem Proving", School of Computer Science, CarnegieMellon Univ., Jan. 2000, pp. 1-28.

Jha, Somesh, et al.; "Minimization and Reliability Analyses of Attack Graphs", School of Computer Science, Carnegie Mellon University, pp. 1-30.

Deswarte, Yves, et al.; "Experimental Validation of a Security Metrics", LAAS-CNRS, pp. 1-6.

Mummidi, Sailaja, et al.; "Information Management System Vulnerability Analysis Study", New Mexico Tech., Nov. 8, 2001, pp. 1-16.

http://www/naseo.org/committees/energy data/energy assurance/, pp. 1-2.

Hutchinson, Bob, et al.; "Lessons Learned Through Sandia's Cyber Assessment Program", Sandi National Laboratories, pp. 1-17.

http://www.comp.nus.edu.sg/apsec2000/index_right.html, Wing, Jeannete M.; "Survivability Analysis of Networked Systems", Carnegie Mellon University, Abstract; van Lamsweerde, Axel; "Building Formal Models for Software Requirements", Universite Catholique de Louvain, Abstract.

* cited by examiner

SYSTEM AND METHOD FOR RISK DETECTION AND ANALYSIS IN A COMPUTER NETWORK

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

Computer networks are plagued with vulnerabilities. Vulnerabilities are weaknesses in computers and devices caused, for example, by bugs or misconfigurations. Attackers attack computer networks by exploiting vulnerabilities, frequently causing damages such as denial of service and theft of corporate secrets. Attackers often exploit several vulnerabilities in a row starting with one device, attacking several devices along the way, and ending at the final target device. Attackers may start attacks from the Internet, an intranet, or any other network.

Consequently, security assessments are performed by, for example, security staff. Typically, security assessments are manual labor intensive processes performed several times per year in various forms such as security audits, penetration testing, and certification & accreditation.

For various reasons, security assessments have become very complex. For example, large networks may have a great many vulnerabilities. In addition, network environments may change extremely frequently, and new vulnerabilities are discovered almost every day. In order to determine the business impact of vulnerabilities, each vulnerability must be examined in both a network and a business context. The impact of a given vulnerability can vary depending on where the vulnerability is found. Furthermore, accuracy of an assessment is compromised when new changes in the network or applications are made. Yesterday's assessment may become obsolete in a day due to the dynamic nature of present day IT environments. All of these factors can have a dramatic negative effect on the efficiency, accuracy, and timeliness of security assessments. Moreover, security incidents are on the rise.

Various detection or assessment devices, such as scanners, can be of use in helping to detect vulnerabilities at a component level, but such devices do not address or incorporate business or IT context considerations. As such, they cannot, for example, provide an overall security "big picture," they cannot help security staff to understand the business impact of any given vulnerability, and they do not enable accurate prioritization of vulnerabilities on a real time or almost real time basis.

A number of references discuss systems and methods to assist security staff in performing security assessments. For example, U.S. Pat. No. 6,324,656, entitled, "System and Method for Rules-Driven Multi-Phase Network Vulnerability Assessment," by Gleichauf et al. discusses a method for performing pinging and port scans of devices on a network to detect vulnerabilities. Gleichauf et al., however, among other shortcomings, limits its methods to pinging and port scanning and does not integrate its scanning methods with other information such as access control lists and business rules.

A January 1998 Sandia National Laboratories report entitled, "A Graph-Based Network-Vulnerability Analysis System," by Swiler et al. discusses a graph-based approach to network vulnerability analysis. The system requires as input a database of common attacks, broken into atomic steps, specific network configuration and topology information, and an attacker profile. The attack information is matched with topology information and an attacker profile to create a superset attack graph. Nodes identify a stage of attack and arcs represent attacks or stages of attacks. By assigning probabilities of success on the arcs or costs representing level-of-effort for the attacker, various graph algorithms such as shortest-path algorithms can identify the attack paths with the highest probability of success. Swiler et al., however, among other shortcomings, uses an inefficient algorithm that is not practical for use in actual field situations having many network nodes and possible attacks that could be launched by an attacker, and does not generate corresponding fixes to eliminate the threats posed by the vulnerabilities.

Today, security assessment is still a manual, labor-intensive process that requires a security savvy person to perform. Due to its manual fashion, the security assessment process as a whole is a snapshot-oriented process that requires large amounts of time to conduct and cannot be performed continuously.

During the scanning phase of vulnerability assessments, a large number of assessed atomic vulnerabilities are generally found. Herein, the term "atomic vulnerability" generally includes vulnerabilities associated with a network node. Immediately fixing all vulnerabilities is not a viable solution due to time and resource constraints. Further, vulnerabilities are not static and new vulnerabilities are often discovered on subsequent scans due to changing network topologies and new vulnerabilities being published. Security staff thus must frequently choose which vulnerabilities to fix. Making this choice in production networks is extremely difficult since halting and changing a production network often requires proof of actual risk of damage to the organization's business, rather than a mere presence of a technical vulnerability.

There is thus a need for systems and methods to conduct security assessments automatically in a computer network. To assist security staff in fixing vulnerabilities, These systems and methods should be of use in determining or fixing vulnerabilities, including, for example, finding the main risks by identifying possible attack scenarios by various threats, determining their business impacts, prioritizing the vulnerabilities according to their contribution to the main risks or other factors, and calculating optimal remedies to the high-priority vulnerabilities.

BRIEF SUMMARY OF THE INVENTION

Generally, the present invention satisfies these needs and provides a method and system to perform automated security assessments in a computer network. In some embodiments, the methods and systems described herein locate possible attack routes, detect flawed configurations of security measures (e.g., access control lists of firewalls or routers), identify actual vulnerabilities, mitigate risks, conform to accepted uses of existing security policies, and perform remedy analysis.

In accordance with some aspects of the present invention, methods are provided for performing automated vulnerability assessment in a computer network, the methods involving gathering information about the network and its components, creating a model of the network (which can include all of its nodes and their configurations/services), simulating possible attacks against the network using attack graphs, generating corresponding consequences of possible attacks, calculating the probability of possible attacks occurring, and ranking vulnerabilities associated with possible attacks. Information about the network may include information regarding vulnerabilities, network topology, services, and configurations of security measures such as access control lists from firewalls, Intrusion Detection Systems ("IDS") information, management frameworks information and other devices. In one embodiment, the information associated with or about the network is gathered by information discovery agents. In some embodiments, the network model may comprise a model of vulnerabilities, network topology, network services, configurations of security measures such as access control lists, configurations of other devices, systems, applications, or combinations thereof. In some embodiments, the corresponding consequences of possible attacks may be represented by numerical values or by textual descriptions. In some embodiments, the probability of possible attacks occurring is based upon the starting point of an attack, upon the end point of an attack, upon the difficulty of executing the attack, upon the length of the attack, upon the frequency of the attack taking place in other networks, or upon combinations thereof. In some embodiments, the vulnerabilities are ranked according to risk whereas in other embodiments, they are ranked according to the difficulty required to fix the vulnerabilities or according to their exploitation difficulty. In some embodiments, vulnerability and risk assessments can be performed automatically and frequently, and resulting information can be provided on a real time or almost real time basis.

In some embodiments, attack simulations are used to determine information such as attack probability information, attack consequence information, risk information, threat information, and potential attack target information. Network models including attack graphs can be used in conducting attack simulations. An algorithm is used in generating attack simulations. The algorithm can first identify or select starting point graph nodes for attacks. The algorithm can then utilize constraint information associated with connecting graph nodes in determining possible attack paths from starting point graph nodes through other connecting graph nodes, and to determine attack termination point graph nodes.

In one embodiment, the invention provides a computerized method for determining actual vulnerability information associated with at least one network node in a computer network. The method includes obtaining raw vulnerability information associated with the at least one network node. The method further includes obtaining network information relating to the computer network. The method further includes, utilizing the raw vulnerability information and the network information, determining the actual vulnerability information associated with the at least one network node. The method further includes storing the actual vulnerability information.

In another embodiment, the invention provides a system for determining actual vulnerability information associated with at least one network node of a computer network. The system includes one or more databases, the one or more databases including raw vulnerability information associated with the at least one network node, and the one or more databases comprising network information associated with the computer network. The system further includes a computer, connectable to the one or more databases. The computer is programmed to, utilizing the raw vulnerability information and the network information as input, generate output including the actual vulnerability information associated with the at least one network node.

In another embodiment, the invention provides a computer usable medium storing program code which, when executed on a computerized device, causes the computerized device to execute a computerized method for determining actual vulnerability information associated with at least one network node in a computer network. The method includes obtaining raw vulnerability information associated with the at least one network node. The method further includes obtaining network information relating to the computer network. The method further includes, utilizing the raw vulnerability information and the network information, determining actual vulnerability information associated with the at least one network node. The method further includes storing the actual vulnerability information.

In another embodiment, the invention provides a computerized method for determining actual vulnerability information associated with a computer network. The method includes obtaining a first set of information associated with the network by utilizing at least one vulnerability information discovery agent. The method further includes obtaining a second set of information associated with the network utilizing at least one network information discovery agent. The method further includes, utilizing the first set of information and the second set of information, determining the actual vulnerability information associated with the network. The method further includes storing the actual vulnerability information.

Additional aspects of the present invention will be apparent in view of the description which follows.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DESCRIPTION OF THE PREFERRED EMBODIMENTS

Preferred embodiments of methods, systems, and computer programs according to the invention are described through reference to the Figures.

The following are examples and illustrations relating to terms used herein, and are not intended to be limiting of the scope of such terms. The term, "network," as used herein, whether itself or in association with other terms, generally includes or refers to not only a network as a whole, but also any components or aspects thereof, such as network nodes, groups of network nodes, or components or aspects of network nodes, as well as services, applications, hardware, hardware components, software, software components, and the like, associated with the network or any component or aspect thereof, as well as any associated configurations. The term, "network service," and similar terms, as used herein, generally includes any software, software components, applications, operating systems, and the like, associated with the network, its nodes, or any other component or aspect of the network, as well as associated configurations, including service configurations, and including services that can be activated from or in association with network nodes. The term, "network information," and similar terms, as used herein, generally includes a variety of types of information relating to the network or any components or aspects thereof, such as network nodes, and includes configurations of or associated with computers, software, software components, applications, operating systems, and the like, including network services information and network topology information. The term "network vulnerability," as used herein, generally includes vulnerabilities such as any kind of IT vulnerabilities, including vulnerabilities at various levels, such as at a network level, an application level, a host level, or a user level.

Figure 1:
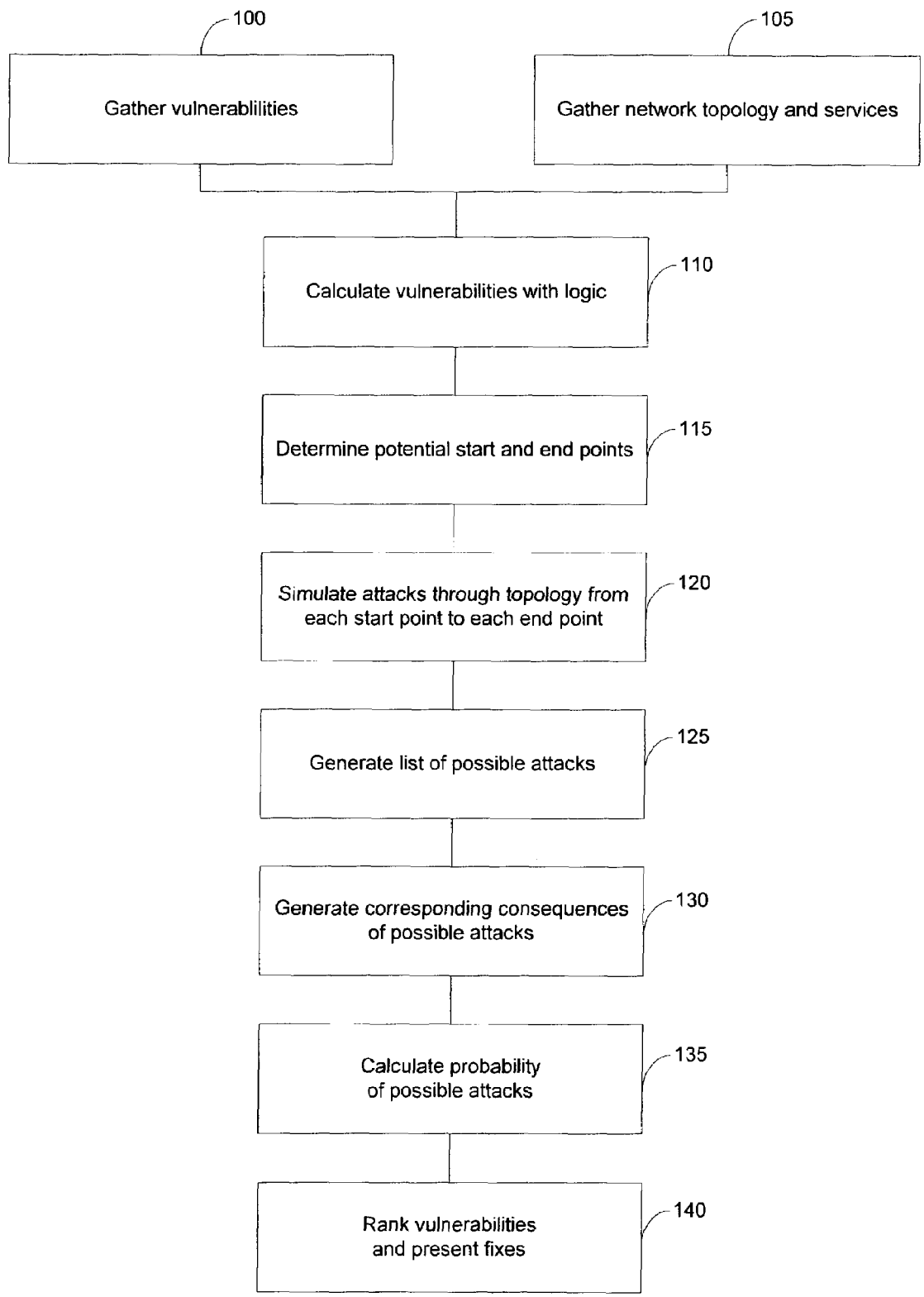
FIG. 1 is a flow diagram showing a method of detecting and analyzing risks in a computer network in accordance with one embodiment of the present invention.

A method of detecting and analyzing risks in a computer network in accordance with embodiments of the present invention is shown in FIG. 1. First, certain information about the network is collected. Raw network vulnerabilities are gathered by one or more information discovery agents, step 100. In some embodiments, these information discovery agents may be manufactured and supplied by third parties such as Internet Scanner or System Scanner by Internet Security Systems, CyberCop Scanner by Network Associates, and Nessus Scanner by the Nessus Project.

Information discovery agents also gather network topology and services information, or configuration of security measures such as access control lists from routers, firewalls, or other devices, step 105. In some embodiments, the network topology, services, and vulnerability information may alternatively be provided in whole or in part by XML data or other data as specified by a user.

By comparing the raw vulnerabilities with information about the network topology and the network services, the system combines vulnerabilities with logic to determine actual vulnerabilities which might be exploited by an attacker, step 110. A vulnerabilities rule set containing logic (which logic can generally include any kind of logic or methodology, including predicate logic or first-order logic, used for organization or presentation of facts, effects, conditions or other information associated with vulnerabilities) specifies combinations of raw vulnerabilities that represent actual vulnerabilities when combined with various network topologies and network services (herein, the term "network information" generally includes network topology information, network service information, or both). A model of the network is thus created detailing the network topology and the actual atomic vulnerabilities present at each network node. As such, "raw vulnerability," as used herein, generally includes theoretical atomic vulnerabilities associated with network nodes as such vulnerabilities would exist without consideration of effects of network information on such vulnerability. Furthermore, "actual vulnerability," as used herein, generally includes atomic vulnerabilities associated with network nodes considering effects of network information on such vulnerability. It is further to be noted that "raw vulnerability," as used herein, includes "filtered raw vulnerability" as described herein.

This topology model of actual vulnerabilities and corresponding network and services information is used by the system to detect and analyze risks posed by attackers. The system creates attack scenarios from the topology model to show potential attack paths which might be used by an attacker to exploit the network. An attack scenario can be presented in the form of an attack graph or other graph-based presentation forms. In some embodiments, attack graphs, graph nodes and edges describe all action routes in a given network. In some embodiments, data representing the attack graph for a network is stored in an array data structure. In some embodiments, an attack graph is presented as a layered graph in which nodes in odd layers represent states of services (i.e. known information), nodes in even layers represent actions, and edges connect the nodes.

Action routes represent paths through the network which may be taken to perform certain actions. An action route can be a legitimate action and comply to a security policy such as reading web pages from web servers or an action route can violate a security policy such as reading web server logs in order to obtain credit card numbers.

A graph node can represent a certain state of a certain service in a network such as obtaining complete control over a web server, gateways such as a router with a cleared access control list ("ACL"), and other entities which might be exploited by an attacker such as an accessible log file. A state of a service can also represent a result of a legitimate action, such a successful login to a certain host. Graph nodes can be associated with network nodes such as, for example, computers, routers, or other devices in a network. Attackers may reach the states by exploiting a vulnerability such as a buffer overflow or by taking some kind of an action such as using telnet to access a device or perform any legitimate action. However, since every action has preconditions, each graph node has a logical constraint associated with it. For example, to perform certain exploits, an attacker must be able to send HTTP packets to a web server. As another example, to compromise certain systems, an attacker must have knowledge of a management password.

Edges represent causal order between states. For example, an edge between the Internet and a fully controlled web server due to a buffer overflow vulnerability would be established if an attacker would be able to open an HTTP connection.

To analyze attack paths or routes using attack graphs for a given network, start and end points for attacks must first be determined, step 115. The start and end points may be input manually by a user or they may be determined automatically by the system based upon the information obtained from the information discovery agents.

To generate the start points automatically, the system finds the perimeters of the network by analyzing all of the ACLs and filtering rule sets collected by the information discovery agents from network routers and firewalls or use information gathered from an Intrusion Detection System. These lists of IP addresses are concatenated to calculate all possible ranges of inbound and outbound IP traffic which represent the possible starting points for an attack on the network.

End points are automatically generated by examining the network topology model and calculating the role of each component of the network. Business rules detailing network threats, damages, and dependencies for various components are interpreted to determine, according to role, which components represent logical end points for attacks.

The system then simulates attacks through the network topology from each start point to each end point by performing attack simulations, step 120. In some embodiments, all attacks from any starting point are simulated without guidance to a certain end point. Attack simulation is the process of creating attack simulation attack graphs for a given network identifying possible attacks through attack paths of the graph.

According to some embodiments, attack graph simulation may use the following pseudo-code algorithm:

1. H:=all states of all services
2. define a constraint for each state
3. C:={attack_starting point}
4. C':=states in {H—C} where the constraint is now evaluated to true
5. if C' is nil then END
6. C:=C and C'
7. go to 4

The graph is first created and graph nodes are populated containing the state each service along with any constraints on that service. Line 1 creates a totally disconnected graph of individual graph nodes stored in an array H, and line 2 associates constraints with individual graph nodes.

The attack simulation then commences in line 3 from a specified attack starting point. In lines 4-7, the system then loops through a moving front-line algorithm by repeatedly evaluating the constraints for every state/graph node that has not yet been reached. If the constraint is met and an attacker is thus able to obtain access associated with the graph node, an edge to the graph node is added from every graph node that enabled the constraint. The moving front-line algorithm continues adding edges to new graph nodes until no more states/graph nodes can be reached at which point the process terminates. In some embodiments, edges can connect graph nodes that represent states in the same host, for example, in the case of an exploitation of privilege escalation vulnerability.

For example, the system selects a starting point graph node from the list of starting points derived in step 115. The topology model of actual vulnerabilities and corresponding network and services information is then accessed to populate the other graph nodes in the network which will make up the attack graph. Vulnerabilities and services are used to associate constraints with each graph node. At this point, all graph nodes are disconnected and simply represent states and constraints of services, gateways, and other entities in the network. Then the moving front-line algorithm commences from the starting point graph node selected and determines whether the starting point graph node can satisfy the constraints associated with other graph nodes to which it is coupled, which can indicate communicatively coupled network nodes. If the starting point graph node can satisfy the constraints associated with a connected graph node, then an edge is drawn in the attack graph between the starting point node and the connecting node. The system then moves on to the connecting graph node and considers whether the connecting graph node can satisfy constraints associated with other graph nodes to which it is coupled. A graph node associated with a vulnerable web server, for example, might still have a constraint that requires the receipt of HTTP packets for the vulnerability (such as a buffer overflow) to be exploited. If a connected network node can send HTTP packets to the web server node, then an edge would be drawn connecting graph nodes associated with the two, and the algorithm would continue until no further graph nodes can be connected.

Due to the moving front-line approach, basic implementation of the attack simulation algorithm has a complexity of $O(N^3)$, where N is the number of services available in the network. Sophisticated implementation can reduce complexity to $O(N^2)$, as well as taking into account several starting points, changing rules of access due to firewall penetration, and other real life issues.

In some embodiments, attack simulations are used to determine information such as attack probability information, attack consequence information, risk information, threat information, and potential attack target information. In some embodiments, expected attack information, indicating risk, is calculated for a given potential attack as the product of attack probability and attack consequence for the potential attack.

In some embodiments, the system uses a "booty bag" or temporary memory storage structure to keep information from previous states useful in creating multiple iterations of attack graphs. For example, in a first attack graph, control may be gained over a given host, but no further constraints could be satisfied in that iteration thus causing the attack simulation algorithm to exit. A second iteration of the attack graph might contain a graph node indicating that control of the host had been obtained which permits sniffing of the network to obtain a management password to compromise other hosts. In this example, the temporary memory storage structure would maintain the information that control had been gained over the host in order to populate the second iteration of the attack graph and accurately determine potential attacks.

Results of the attack simulation are stored in memory and used to generate a list of possible attacks on the network, step 125. Once the list of possible attacks is generated, the system then calculates the corresponding consequences of each possible attack, step 130. The attack route for each possible attack has a start point and an end point. Intermediate points of an attack route are end points of previous iterations of the attack route and also considered. As such, all network nodes which an attacker can compromise may be associated with end points, regardless of whether they are intermediate points of an attack route or ultimate end points of the final route.

Accordingly, consequences of attacks are generated according to the potential damage caused by an attacker reaching an end point of an attack route. Each end point of an attack route has data associated with it representing the consequences of the end point being compromised by an attacker. In some embodiments, the consequences data is in the form of an numerical impact weight used to calculate an attack's impact on business systems or activities, an arbitrary potential damage number, a text description, or combinations thereof. Consequences data for each end point is manually entered by a user or alternatively, is automatically generated by the system according to business rules stored in memory regarding dependencies and other information.

In some embodiments, the system also associates consequences data with indefinite risks to various end points. Possible attacks represented by attack graphs can be thought of as definite risks. The attack graph and corresponding attack routes depict actual vulnerabilities which could be exploited to compromise the network. Indefinite risks are non-specific attacks or consequences that would affect the network which are not tangibly represented by attack graphs. An example of an indefinite risk would be an attacker gaining control of a host despite the lack of a corresponding attack graph indicating that such control is possible. The system in such a case associates consequences data with the event simply to indicate the effect that the event would have if it took place. Other examples of consequences which might not be represented by attack graphs include natural disasters, malicious actions by authorized users, power outages, physical destruction of network resources, and other similar events.

The system calculates the probability of possible attacks, step 135. Probability data is stored in memory in a rules database, an attack database, or other database and represents the likelihood that a potential attack will take place. Probability data is stored regarding the probability of an attack starting at various points on a network, the probability of an endpoint being the target of an attack, the difficulty level of executing the attack, the length of the attack through the network nodes, the frequency of a vulnerability being exploited, and other information useful in calculating the likelihood of possible attacks taking place. For example, attack simulation may expose or discover a potential attack, but the number of steps or level of technical sophistication required to execute the potential attack are so great that the actual risk of the potential attack taking place is extremely small.

The probability of an attack taking place is combined with the consequences data to rank the vulnerabilities according to actual risks presented and present fixes for the vulnerabilities, step 140. In some embodiments, the system also ranks the risk level of threats and attacks, as well as the risks of business applications and IT infrastructure. In some embodiments, risk takes into account the degree or magnitude of potential damage from a particular attack as well as a probability of such an attack. Vulnerabilities with high consequences data and a high probability of being executed will rank higher in terms than vulnerabilities with lower consequences data and lower probability of being executed. The system also presents fixes for eliminating vulnerabilities according to information stored in a fix database. In some embodiments, users may optionally choose to rank vulnerabilities according to actual risk presented, fix complexity, business logic, and weighted combinations thereof. For example, in some embodiments, vulnerabilities that require significantly more complicated fixes may rank lower than vulnerabilities with similar or greater actual risks of attack that require easier fixes.

Figure 2:
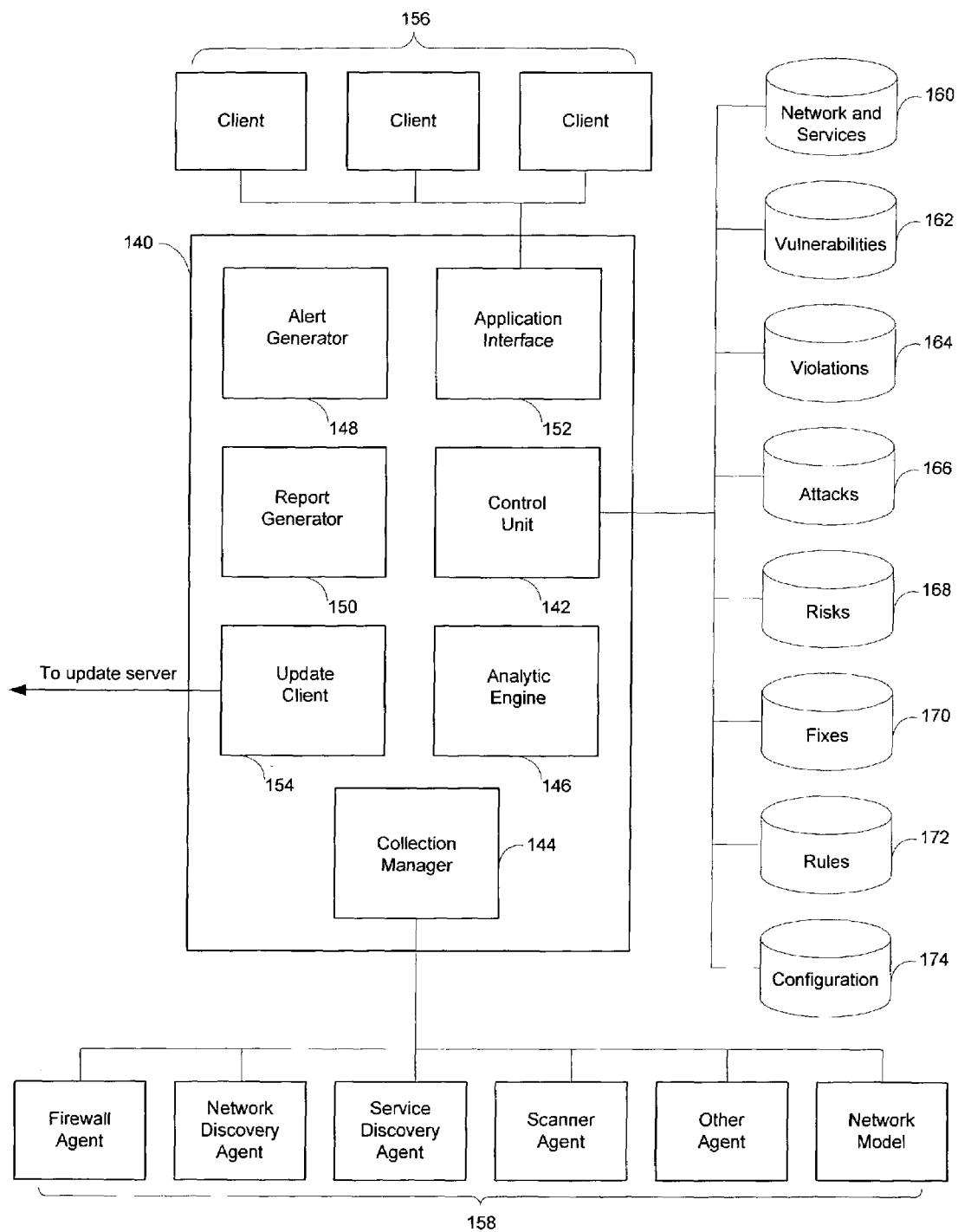
FIG. 2 is a block diagram depicting components of a system to detect and analyze risks in a computer network in accordance with one embodiment of the present invention.

FIG. 2 is a block diagram depicting components of a system in accordance with one embodiment of the present invention. As shown, the system includes a server computer 141 comprising server software, including a control unit module 142, a collection manager module 144, an analytic engine module 146, an alert generator module 148, a report generator module 150, an application interface module 152, and an update client module 154. The system also includes a client computer 156, comprising client software, including one or more information discovery agents 158, a network and services database 160, a vulnerabilities database 162, a violations database 164, an attacks database 166, a risks database 168, a fixes database 170, a rules database 172, and a configuration database 174. It is to be understood that, while, in the embodiment depicted, the server software and the client software are located at the server computer 141 and client computer 156, respectively, in other embodiments, the server software and the client software can be located at or executed from other computers or locations.

The control unit 142 coordinates communications between the other modules of the system. The control unit 142 also manages and directs the other modules in the system in performing their respective functions. For example, the control unit 142 activates scheduled tasks including data collection by the collection manager 144 data processing by the analytic engine 146, reporting by the reports generator 150, alerts by the alert generator 148, and updates by the update client 154. The control unit 142 also serves as the interface to and directs data flow from the network and services database 160, the vulnerabilities database 162, the violations database 164, the attacks database 166, the risks database 168, the fixes database 170, the rules database 172, and the configuration database 174.

The collection manager 144 is responsible for coordinating network data collection performed by the discovery agents 158. The control manager 144 activates the agents, distils information received by the agents according to rules stored in the rules database 172 and the configuration database 174, and updates the network and services database 160 with changes and information received from the discovery agents 158.

The discovery agents 158 collect network information regarding raw vulnerabilities, topology, services, and other information. Exemplary discovery agents 158 include firewall agents, network topology agents, service agents, raw vulnerability scanner agents, and other agents. Specialized agents collect specific information from specific network nodes. For example, firewall agents, for example, collect access control lists and filtering rule sets; network topology agents collect information about interconnections between network devices and hosts; network service agents collect lists of services operating on network hosts and devices; and raw vulnerabilities agents collect information regarding vulnerabilities as previously described herein. In some embodiments, the network topology, services, and vulnerability information may alternatively be provided in whole or in part by XML data or other data as specified by a user. The discovery agents 158 can coexist with other of the discovery agents 158, or with the server software or client software on the same host. Discovery agents 158 operate according to scheduled frequencies as specified by the user and stored in the configuration database 174. In some embodiments, discovery agents 158 operate continuously. Alternatively, discovery agents 158 operate on demand when specified by a user, or activated by the collection manager 144, or otherwise event-driven.

The analytic engine 146 performs the actual analysis on the data collected by the discovery agents 158, vulnerabilities stored in the vulnerabilities database 162, and rules stored in the rules database 172. The analytic engine 146 contains a software functions which calculate vulnerabilities with logic, determine potential start and end points for attack routes, perform attack simulation, generate lists of possible attacks, calculate consequences of possible attacks, determine probabilities associated with possible attacks, rank actual vulnerabilities, present fixes, and perform other analytic actions as further described herein. The analytic engine 146 operates according to scheduled frequencies as specified by the user and stored in the configuration database 174. In some embodiments, the analytic engine 146 operates continuously. Alternatively, the analytic engine 146 operates on demand when specified by a user or directed by the control unit 142, or can be otherwise event-driven.

The alert generator 148 issues alerts according to vulnerabilities, risks, or violations detected as specified by preferences stored in the configuration database 174. For example, the alert generator 148 issues alerts that may lead to immediate action items such as extremely high risk vulnerabilities. The alert generator 148 operates according to scheduled frequencies as specified by the user and stored in the configuration database 174. In some embodiments, the alert generator 148 operates continuously. Alternatively, the alert generator 148 operates on demand when specified by a user or directed by the control unit 142, or can be otherwise event-driven.

The report generator 150 creates reports of analysis results, system activities, rule sets, and other items as specified by a user. Reports are generated in Rich Text Format, Portable Document Format, and other report formats known in the art. The report generator 150 operates according to scheduled frequencies as specified by the user and stored in the configuration database 174. In some embodiments, the report generator 150 operates continuously as in the case of creating log files of system activities. Alternatively, the alert generator 148 operates on demand when specified by a user or directed by the control unit 142, or can be otherwise event-driven.

The application interface 152 provides functions that enable the modules of the server software and the client software to communicate with each other. For example, the application interface 152 coordinates communications between the client computers 156 and the control unit 142, the collection manager 144, the analytic engine 146, the alert generator 148, the report generator 150, and the update client 154. The application interface 152 also supports a graphical user interface ("GUI") at the client computers 156 or provided through client software, which permits users of the client computers or client software to conduct rules editing, to configure scheduled reports and alerts, to conduct interactive analysis, editing and browsing of the network model, vulnerabilities, and analysis results, to view the state of security of the network, to perform user management, to perform task management, to perform agent management, and to perform other activities in communication with the server software. In some embodiments, the client GUI is color coded according to risks presented by vulnerabilities detected.

The update client 154 is responsible for obtaining updates of the system. System updates are obtained from an update server operated by the assignee of the present application or from other servers as specified by the user or stored in the configuration database 174. Update information includes updates of the vulnerabilities rule set, updates of the system software and modules, updates of the discovery agents 158, updates regarding vulnerability fixes, and other information useful in the operation of the system. The update client 154 operates according to scheduled frequencies as specified by the user and stored in the configuration database 174. In some embodiments, the update client 154 operates continuously checking for new updates or information. Alternatively, the update client 154 operates on demand when specified by a user or directed by the control unit 142. In some embodiments, the update client 154 operates upon receipt of a signed email or other instruction from the update server.

The server computer 141 is communicatively coupled to a number of databases 160–174 which store data used by the system to detect and analyze risks in a computer network. In some embodiments, two or more of the databases160–174 can be combined into a single database. The network and services database 160 stores information regarding the network topology and network services, which can include service configuration information. The vulnerabilities database 162 stores information regarding vulnerabilities including raw vulnerabilities collected by the network discovery agents 158 and the vulnerabilities rule set used to add logic to raw vulnerabilities. The violations database 164 can store policy violations detected by the system, alerts generated and their status, and reports generated, or, in some embodiments, information such as the alert information and the report information can be stored in one or more other databases. The attacks database 166 stores analysis results regarding attacks including attack graphs, attack routes, start points, end points, and other similar information. The risks database 168 stores probability data regarding the likelihood of possible attacks occurring, and can store potential damage data associated with each of several attack scenarios. The fixes database 170 stores information regarding how to eliminate and fix vulnerabilities detected by the system. The rules database 172 stores filtering rules which contain assertions for the existence of assets or vulnerabilities, policy rules regarding permitted access and services, and business rules regarding threats, damages, and dependencies. The configuration database 174 stores information regarding users, system security, agent preferences, task scheduling, alerts and reports configuration, and other configuration information used by the system. In some embodiments, the data stored in the network and services database 160, the vulnerabilities database 162, the violations database 164, the attacks database 166, the risks database 168, the fixes database 170, the rules database 172, and the configuration database 174 is stored in a single database.

Figure 3:
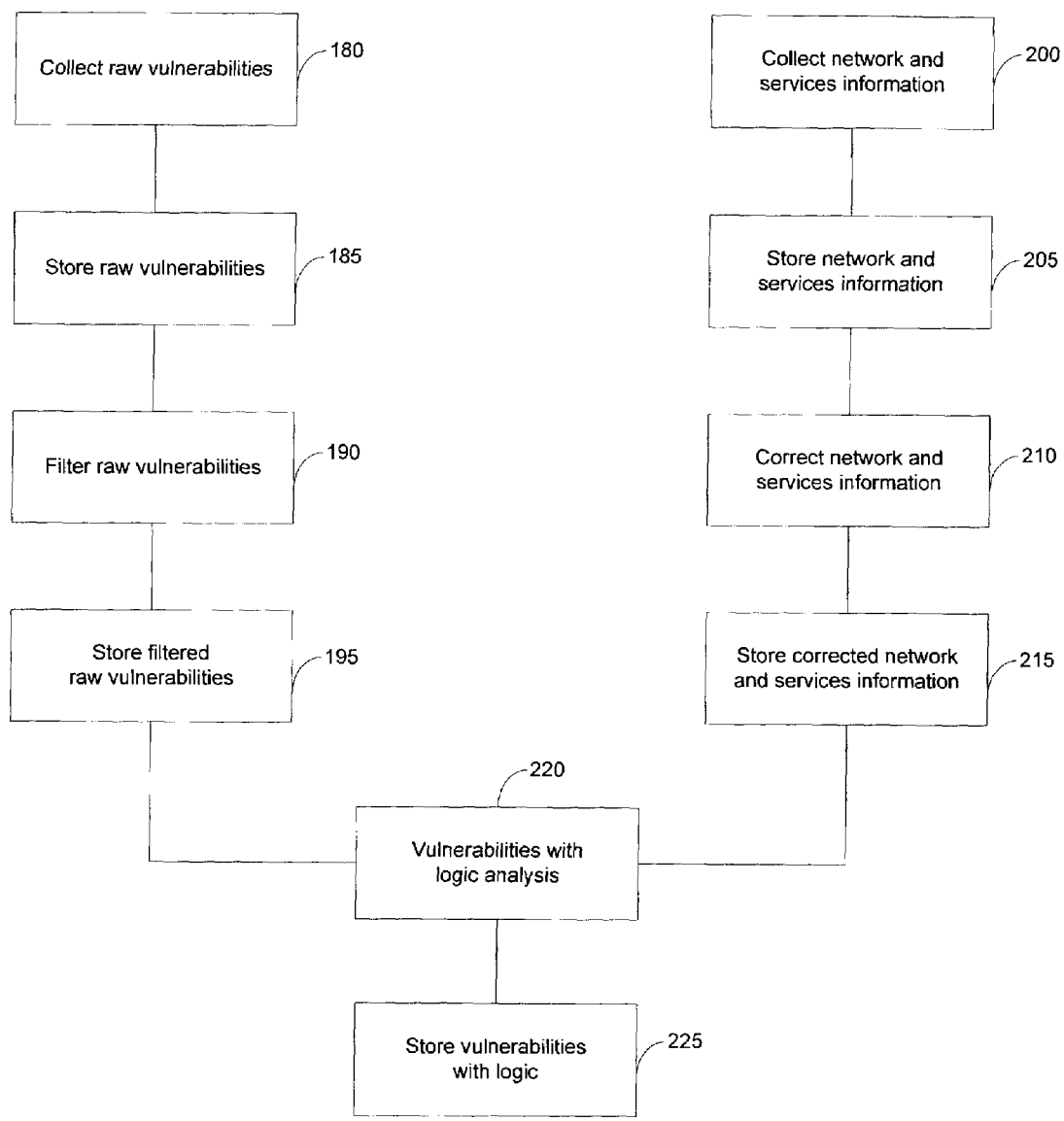
FIG. 3 is a flow diagram showing a method of verifying actual vulnerabilities in a computer network in accordance with one embodiment of the present invention.

FIG. 3 is a flow diagram showing a method of verifying actual vulnerabilities in a computer network in accordance with one embodiment of the present invention. Discovery agents 158 collect raw vulnerabilities of the network hosts and devices, step 180. To find raw vulnerabilities which could be exploited, the information discovery agents scan the network from the perspective of an attacker by starting attacks, but stopping before too much damage is done. Packets of data are sent to each network device and any responses received back from the network devices are interpreted to determine whether a raw vulnerability exists. For example, an information discovery agent might test to determine whether a particular version of BIND vulnerable to attacks is present. The information discovery agent would send packets containing a query command for the BIND server on a network to return its version number. If the BIND server returns a version number which is known to be vulnerable to attacks, the information discovery agent would report the raw vulnerability. For example, in some embodiments, scanners, as are known in the art, can be utilized.

Raw vulnerabilities collected by the discovery agents 158 and other methods are stored in the vulnerabilities database 162, step 185. The analytic engine 146 retrieves the raw vulnerabilities and filters the raw vulnerabilities to remove false positives, step 190. For example, the discovery agents 158 might detect a service which presents a vulnerability when running on an AS400 computer. During the filtering step 190, however, the analytic engine 146 consults filtering rules stored in the rules database 172 and determines that there are no AS400 computers present in the network. The raw vulnerability thus presents a false positive and is deleted by the analytic engine 146. Filtered raw vulnerabilities are returned to the vulnerabilities database 162, step 195.

Information discovery agents 158 also collect information regarding network topology and services, step 200. Information is collected from the network hosts and infrastructure including firewalls, routers, other scanners, intrusion detection systems, and network management software. Additionally, pinging, port scanning, traceroute, arp-walk and other known techniques are used by these agents to map the topology of the network including interconnections between network devices and hosts, types of network devices and hosts, and services running on each network device and host. This information is stored in the network and services database 160, step 205.

The analytic engine 146 retrieves the network topology and services information from the network and services database 160 and filters the information to correct any errors, step 210. For example, the discovery agents 158 might not be able to identify the particular version number or type of operating system and only indicate that Unix is the operating system. During the filtering step 210, however, the analytic engine 146 consults filtering rules stored in the rules database 172 and determines that the version of Unix used in the network is Solaris 4.6. The generic service information is thus corrected by the analytic engine 146 and updated to indicate Solaris 4.6. Corrected network and services information is stored in the network and services database 160, step 215.

The analytic engine 146 retrieves the filtered raw vulnerabilities information from the vulnerabilities database 162 and the corrected network and services information from the network and services database 160 to analyze vulnerabilities with logic, step 220. As previously described herein, the analytic engine 146 determines actual vulnerabilities by consulting a vulnerabilities rule set containing predicate logic specifying combinations of raw vulnerabilities that represent actual vulnerabilities when combined with various network topologies and network services. As such, in some embodiments, the logic can specify pre-conditions for exploitation of vulnerabilities. The vulnerabilities with logic results are stored in the vulnerabilities database 172, step 225.

In some embodiments, information discovery agents can include vulnerability information discovery agents for obtaining vulnerability information, as well as network information discovery agents for obtaining network information. In some embodiments, vulnerability information discovery agents include testing tools such as scanners (which scanners can include software components, aspects, or modules, hardware components, aspects, or modules, or both), including network scanners and host-based scanners, used in determining network vulnerabilities, including application vulnerabilities, host vulnerabilities, and other vulnerability information.

In some embodiments, network information discovery agents (which can include software components, aspects, or modules, hardware components, aspects, or modules, or both) are used in obtaining network information, such as operating system version, host addresses, interconnections between hosts, services running on a particular host, versions of the services, ports used by the services, and other network information, and can include firewall agents, network topology agents, and service agents.

Figure 4:
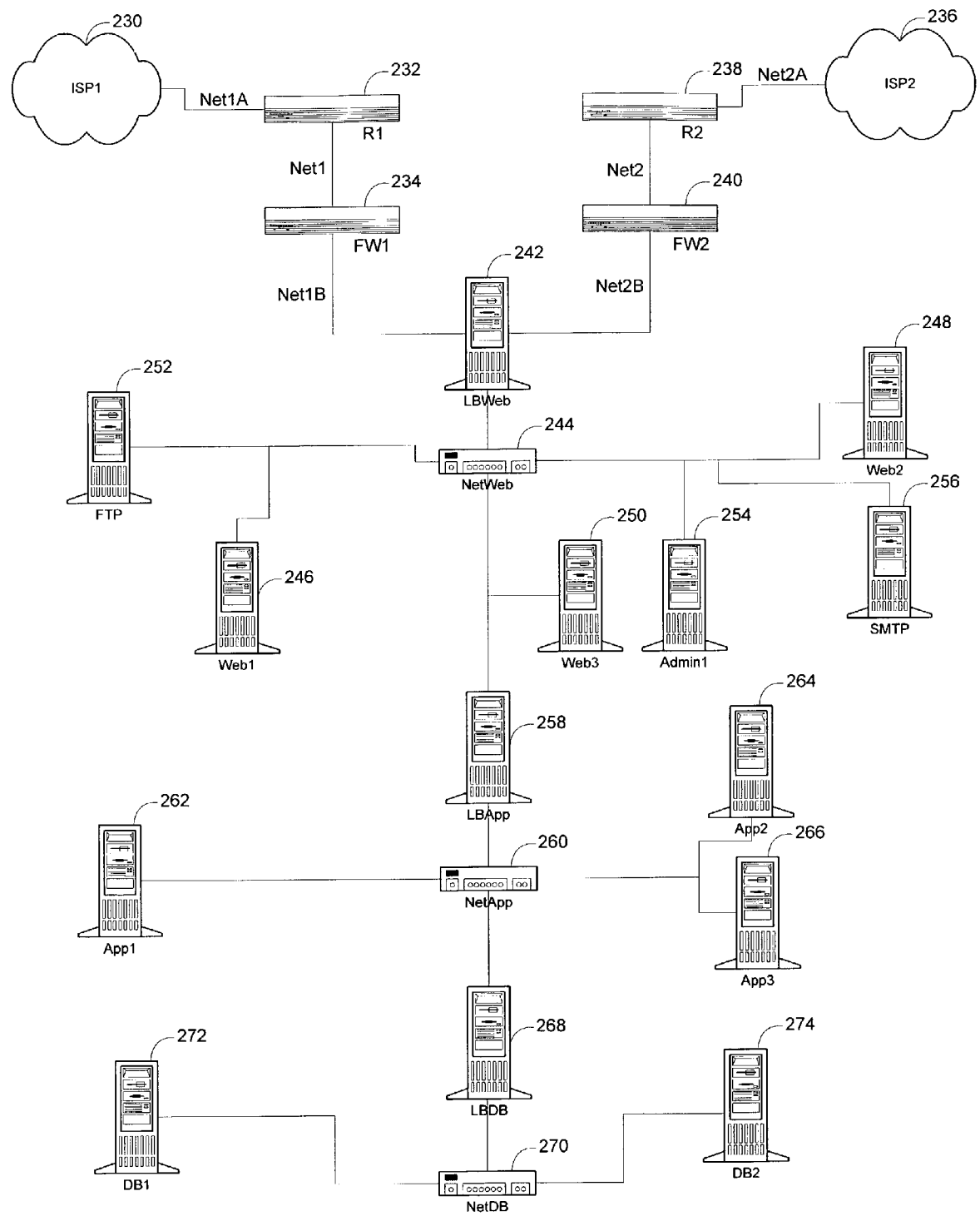
FIG. 4 is a block diagram depicting an exemplary computer network whose risks may be detected and analyzed in accordance with one embodiment of the present invention.

FIG. 4 is a block diagram depicting an exemplary computer network whose risks may be detected and analyzed in accordance with one embodiment of the present invention. As shown, the network has a two Internet service provider ("ISP") connections 230 and 236, two routers 232 and 238, two firewalls 234 and 240, a farm of web servers 246, 248, and 250, a farm of application servers 262, 264, and 266, two database servers 272 and 274, three load balancing servers 242, 258, and 268, an FTP server 252, an SMTP server 256, an administration server 254, and three network devices such as switches 244, 260, and 270.

In the example, the network discovery agents 158 performed internal and external scans on the network to detect topology, vulnerabilities, and services. Vulnerabilities with logic analysis was performed by the analytic engine 146 to produce the following report:

| Machines | Service | Vulnerability or policy violation | Precondition | Effect |
| --- | --- | --- | --- | --- |
| Web Server 246<br>Web Server 248<br>Web Server 250 | IIS | Buffer overflow | Network access to port 80 from remote controlled service exists | Access to the operating system under the user "nobody" |
| Web Server 246<br>Web Server 248 | NetBios | Service exists | Network access to ports 137–139 from remote controlled service exists | Files may be accessed remotely |
| Web Server 248 | Win2K | NetDDE message | Nobody privilege in local controlled service exists | Privilege escalation from nobody to system |
| Application Server 262<br>Application Server 264<br>Application Server 266 | HTTP (8080) Management Console | Service exists | | Remote management (given password) |
| Load Balance Server 258 | Filtering | Port 8080 not filtered | | Application management console is accessible from Internet |
| Application Server 262 | HTTP (8080) Management Console | Weak password | Network access to port 8080 from remote controlled service exists | Password can be cracked using brute force |

-continued

| Machines | Service | Vulnerability or policy violation | Precondition | Effect |
| --- | --- | --- | --- | --- |
| Router 232 | Router | Remote configuration loading via TFTP from FTP server 252 (/public/router) | Network access to port 21 from remote controlled service exists | Changing configuration on FTP server 252 will reconfigure router on next boot |
| Router 232 | Router | Remote boot | Network access from remote controlled service exists | Router reboots on processing certain packets |
| FTP Server 252 | FTP | /public is world write-able | Network access to port 21 from remote controlled service exists and /public has read-write privileges to all users | Any computer from Internet can write to /public |
| Router 232 Router 238 Firewall 234 Firewall 240 Load Balance Server 242 Load Balance Server 258 Load Balance Server 268 | Filtering | SQL port is open for access from outsource.dba.com (used by outsourced DBA service) | Network access to port 1521 from remote controlled service in outsource.dba.com exists or spoofing is possible from a remotely controlled host | Any SQL connections coming from outsource.dba.com will be permitted |
| Administration Server 254 | Rlogin | Web server 246 is a trusted host | Network access to port 513 from remote controlled service exists | Administration server 254 allows rlogin from web server 246 without a password |
| Administration Server 254 | Finger | Service exists | Network access to port 79 from remote controlled service exists | Administration server 254 provides information about its users to the world |
| Administration Server 254 | Solaris | Sniff | Root privilege on local service exists | Administration server 254 can sniff the local network |

The report illustrates how attack routes generated during attack simulation represent verified vulnerabilities that could be used by an attacker to exploit the network. For example, an attacker could obtain information from the internal database as shown below. According to the example, the attack graph would start with all graph nodes disconnected and indicating the attack commencing from ISP 230.

In the first iteration, the preconditions for buffer overflow on the web servers 246, 248, and 250 are met since an attacker from the ISP 230 can send HTTP packets to the web server nodes. Edges are added from the ISP 230 to the web servers 246, 248, and 250.

In the second iteration, the attacker can penetrate the administration server 254 from the web server 246. The attacker also can penetrate the application servers 262, 264, and 266 by exploiting the HTTP management console using a brute force password attack via the load balance server 258. The attacker can also penetrate the FTP server 252 by writing to /public. Edges are thus added on the second iteration to include the administration server 254, the application servers 262, 264, and 266, and the FTP server 252.

In the third iteration, the attacker can rlogin to the administration server 254 and sniff the network to find a SQL client password for the database servers 272 and 274 and put the password in the web server 246's published pages. This information is stored in the "booty bag" for use in future iterations. The attacker can also exploit the remote configuration loading FTP vulnerability of the router 232 by FTPing a new router 232 configuration file that allows spoofing of outsource.dba.com connections and rebooting the router 232 remotely. An edge is added to include the router 232.

In the fourth and final iteration, the attacker can now reach and exploit the database servers 272 and 274. Since the router 232 has a new configuration file, the attacker can now spoof a SQL connection from outsource.dba.com using the sniffed password stored in the "booty bag" and retrieve information from the data the database servers 272 and 274. An edge is added to include the database servers 272 and 274.

Further analysis shows that the attacker perform a number of other attacks. For example, the attacker could exploit the network DDE vulnerability and read web server logs in order to get credit card numbers by gaining "nobody" control over the web server 248, escalating privileges to gain control, and copying the logs into a published directory. Alternatively, the attacker could copy the logs from the web server 248 directly as an HTTP client from the Internet. The attacker could also shutdown and perform a denial of service attack ("DoS") on the application servers 262, 264, and 266 or the web servers 246, 248, and 250 since the attacker can gain complete control of these nodes.

As can be seen from the example, fixing all of the vulnerabilities could take several days and destabilize the entire network. The present system permits prioritization of vulnerabilities by performing risk mitigation analysis of the vulnerabilities. For example, some vulnerabilities listed in the report such as the web server 246 and 248 NetBios vulnerability and the administration server 254 finger vulnerability are not used in any attacks since these protocols are blocked by the firewalls 234 and 240. Fixes for these vulnerabilities can thus be put off until a later date.

Security administrators can then prioritize fixes for the remaining vulnerabilities. For example, a security administrator can decide to first fix attacks on customer data. The report readily shows that these attacks can be prevented by disabling the network DDE on the web server 248, making/public read-only on the FTP server 252, and disabling rlogin from the web server 246 to the administration server 254. Once these fixes have been performed, the security administrator can then focus on fixing the denial of service attacks by patching the web servers 246, 248, and 250 to prevent buffer overflows, patching the router 232 to prevent remote configuration loading, replacing the application server 262 password, and blocking port 8080 from network device 244 to network device 260.

As illustrated by the preceding example, the system thus provides for attack route locating by ignoring policy-approved access routes and only focusing on attack routes. The system also detects flawed configurations to calculate firewall misconfigurations such as when the load balance server 258 failed to filter the management port 8080 between network device 244 to network device 260. The system also mitigates risks by atomic false-positives removal based on mitigation by security devices as in the case of the weak password vulnerability of the application server 262 after fixing the filtering problem with load balance server 258. The system also makes allowances for accepted use by atomic false-positives removal based on accepted security policies as in the case of the existence of the FTP server 252 being reported by a scanner as a vulnerability, but then discarded if allowed by a security policy. The system also performs remedy analysis to calculate the minimal correction for all possible attacks from origin to destination as in the example of offering two alternatives to prevent attacks from the ISP 230 by either changing the management password for the application server 262.

Figure 5:
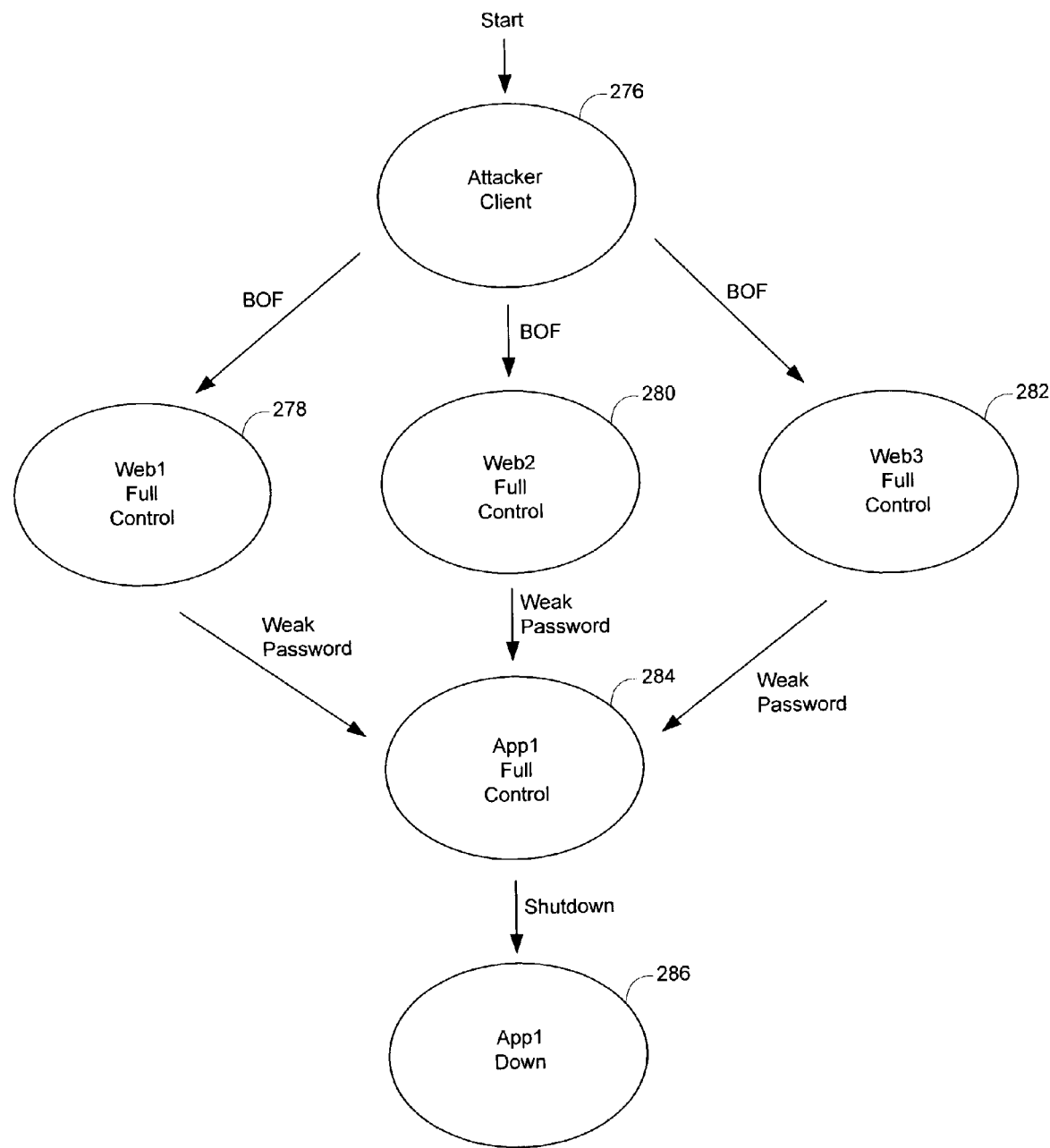
FIG. 5 is a flow schematic diagram showing an exemplary attack graph in accordance with one embodiment of the present invention.

FIG. 5 is a flow schematic diagram showing an exemplary attack graph corresponding to a DoS attack on the application server 262 in accordance with one embodiment of the present invention. As shown, graph nodes include a graph node 276, representing an attacker controlling a client host, a graph node 278 representing full control of the web server 246 by the attacker client of the graph node 276, a graph node 280 representing full control of the web server 248 by the attacker client of the graph node 276, a graph node 282 representing full control of the web server 250 by the attacker client of the graph node 276, a graph node 284 representing full control of the application server 262 by the attacker client of the graph node 276, and a graph node 286 representing a shutdown of the application server 262 by the attacker client of the graph node 276.

The attack commences at the attacker client of the graph node 276. The attacker client is able to gain "nobody" control over the web servers 246, 248, and 250 by exploiting the buffer overflow vulnerability. Edges are drawn from the graph node 276 to the graph nodes 278, 280, and 282. Once the attacker gains "nobody" control over the web servers 246, 248, and 250, the attacker can move from the graph nodes 278, 280, and 282 to the graph node 284 by connecting to the application server 262 port 8080 and performing a brute force attack against the weak management password. From the graph node 284, the attacker has full control of the application server 262 and is able to move to the graph node 286, thus completing the DoS attack.

In some embodiments, raw vulnerabilities are collected in real time from network and system security measures such as intrusion detection systems and other devices. Vulnerability scanner information is generally static and reveals vulnerabilities according to fixed specified host configurations among other things. Collection of real time data such as IDS data, however, allows for dynamic vulnerability analysis. For example, log files from an IDS can be used as input to indicate which network hosts and other elements are actually receiving suspicious network traffic or subject to other questionable events. This statistical IDS information can be used, among other things, to improve risk calculations. For example, IDS log files indicating possible attacks or suspicious traffic during a given time period can be evaluated and classified according to type of attack, location of attack, location of attacker, and other factors. If this classification indicates that the IDS system is detecting a higher or lower frequency of a particular attack, location of attack, etc., then the probability data, consequences data, and other data described herein can be re-weighted to more accurately calculate risks to the host(s), business applications, IT infrastructure, and other elements of the system.

In some embodiments, integrating the system with an IDS system also improves the accuracy of the IDS system. Ranked risks generated by the system as described herein are used to more accurately evaluate IDS alerts and also rank alerts more accurately, thus eliminating many of the false positives issued by an IDS systems and also helping to manage the sheer volume of alerts generated by an IDS system. For example, IDS alerts can be evaluated and ranked against, among other things, the business and IT rules, contexts, impacts, and logic generated by the system. For example, an IDS system might issue an alert that it has detected network traffic to a particular host that appears to be trying to exploit a vulnerability known to affect IIS servers. However, when the alert is viewed in the context of information generated by the present system, the information indicates that the host is running an Apache server and not an IIS server, thus the alert is either discarded or ranked as a minimal risk accordingly. Conversely, IDS alerts regarding important hosts as defined by business logic and other logic used by the present system would be ranked as higher risks. In some embodiments, the system is also configured to control and instruct intrusion network and security system measures such as intrusion detection systems, and other devices automatically with respect to preventing, defending, or otherwise taking steps against attacks, exploits, and other activities based upon the raw vulnerabilities discovered.

Systems and modules described herein may comprise software, firmware, hardware, or any combination(s) of software, firmware, and/or hardware suitable for the purposes described herein. Software and other modules may reside on servers, workstations, personal computers, computerized tablets, PDAs, and other devices suitable for the purposes described herein. Software and other modules may be accessible via local memory, via a network, via a browser or other application in an ASP context, or via other means suitable for the purposes described herein. Data structures described herein may comprise computer files, variables, programming arrays, programming structures, and/or any electronic information storage schemes or methods, or any combinations thereof, suitable for the purposes described herein. User interface elements described herein may comprise elements from graphical user interfaces, command line interfaces, and other interfaces suitable for the purposes described herein.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

What is claimed is:

1. A method for performing risk assessment in a computer network, the method comprising:

generating a network topology model for the computer network, the network topology model including a set of network nodes, a set of actual vulnerabilities associated with the network nodes, and a set of access rules associated with the network nodes;

determining, among the set of network nodes, one or more start points, by analyzing a set of access control lists and filtering rules from one or more network devices, the set of access control lists and filtering rules collected by a network discovery agent to determine the start points, and one or more end points of one or more potential attack paths through the network topology model;

generating an attack graph comprising a set of graph nodes wherein each graph node represents a state of a single service in the network;

simulating one or more attacks from one or more start points to one or more end points using the attack graph; and storing the results of the attack simulation in a computer memory.

2. The method of claim 1, wherein the one or more network devices comprise one or more network firewalls.

3. The method of claim 1, wherein the one or more network devices comprise one or more network routers.

4. The method of claim 1, wherein analyzing a set of access control lists and filtering rules comprises concatenating a plurality of network addresses associated with the set of access control lists and filtering rules to calculate a range of inbound and outbound network addresses that represent possible start points for the potential attack paths.

5. The method of claim 1, wherein determining the one or more start points comprises determining the start points according to a user input.

6. The method of claim 1, wherein generating an attack graph comprises generating an attack graph using a moving front-line algorithm.

7. The method of claim 1, the method further comprising associating consequence data with endpoints.

8. The method of claim 4, wherein concatenating a plurality of network addresses associated with the set of access control lists and filtering rules comprises concatenating lists of IP ranges from the set of access control lists and filtering rules.

9. The method of claim 6, wherein generating an attack graph using a moving front-line algorithm comprises:

simulating an attack from a first node in the attack graph;

determining whether a set of constraints associated with at least a second graph node that has not yet been reached by the simulated attack satisfies a set of attack criteria; and adding an edge connecting the starting point node to the at least a second graph node if the set of constraints satisfies the set of attack criteria.

10. The method of claim 7, wherein the consequence data comprises numerical consequence data.

11. The method of claim 10, wherein the consequence data is calculated at least in part according to the potential damage caused by an attacker reaching an endpoint.

12. The method of claim 11, the method further comprising calculating probability data associated with attacks on endpoints.

13. The method of claim 12, the method further comprising ranking vulnerabilities using at least the consequence data and the probability data.

* * * * *